(12) United States Patent
Chen

(10) Patent No.: US 6,364,070 B1
(45) Date of Patent: Apr. 2, 2002

(54) SCOOTER HAND & FOOT BRAKING MECHANISM

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/955,987

(22) Filed: Sep. 20, 2001

(51) Int. Cl.⁷ ............................. B60T 1/00; B62M 1/00
(52) U.S. Cl. .................. 188/19; 280/87.041; 280/87.05
(58) Field of Search ............................ 188/2 D, 19, 29; 280/87.01–87.05

(56) References Cited

U.S. PATENT DOCUMENTS

| | | | | |
|---|---|---|---|---|
| 5,325,938 A | * | 7/1994 | King ............................. | 188/19 |
| 6,120,044 A | * | 9/2000 | Tsai ......................... | 280/87.05 |
| 6,286,632 B1 | * | 9/2001 | Chai ............................ | 188/29 |

* cited by examiner

Primary Examiner—Chris Schwartz
(74) Attorney, Agent, or Firm—Rosenberg, Klein & Lee

(57) ABSTRACT

A scooter hand/foot braking mechanism comprises a frame with its rear end of the frame being pivoted to rear wheel; a braking plate related to a flat portion having at its front end formed an arc portion and its rear end a pivot holder for accommodating a pivot inserted through by a return coil before the braking plate being pivoted to the frame; a pair of wings respectively extending from both sides at the upper end of the arc portion with each attached at its inner side with a felt keeping a certain spacing from the rear wheel as long as the braking either by hand or by foot not applied; and the linkage related to an arc portion having its upper end curved to form a plane provided with a hole and fixed under the flat portion of the braking plate with a bolt and a nut while another hole provided in the arc portion to restrict the braking wire to pull the linkage and the braking plate.

2 Claims, 5 Drawing Sheets

SCOOTER HAND & FOOT BRAKING MECHANISM

BACKGROUND OF THE INVENTION

1. (a) Field of the Invention

The present invention relates to a scooter provided with hand and foot braking mechanism, and more particularly to one with said mechanism applied to a rear wheel of the scooter that can be operated either by hand or by foot to brake the scooter.

2. (b) Description of the Prior Art

The prior art of a braking mechanism for the scooter is either provided with the handle for hand braking or with the rear wheel for foot braking. Hand braking is easy to apply, but in poor efficiency since it takes to glide for a certain distance before stopped the scooter. The reason is that it takes a certain lag of time before executing the braking as it is activated at the distal end of the braking wire. As for the foot braking, it provides fast braking. However, as the foot braking is executed by stepping on the braking mechanism by one's heel and it is difficult to maintain braking due to the instantaneous inertia from the braking will push the rider to lean forward. As a result, the scooter may move forward immediately after the braking to put the rider in danger. The hand braking is efficient in the course of frequent operation during deceleration while the hand braking works better in case that immediate braking is desired. However, in practical use, both fashions are required in emergency and the prior art appears to fail to meet this need.

A hand/foot braking mechanism as disclosed in U.S. Pat. No. 6,120,044 claims to serve its purpose. If fact, it does not solve those problems as disclosed above because that the foot braking is provided at the front end of the frame and activated by the distal end of the braking wire as does by the ordinary hand braking, meaning, a lag of time exists between application of band or foot braking and when the scooter is actually stopped.

SUMMARY OF THE INVENTION

The primary purpose of the present invention is to provide a hand/foot braking mechanism for a scooter that functions to immediately stop the scooter either by hand or foot braking. To achieve the purpose, the braking mechanism comprises a frame, a braking plate, a linkage and a braking wire. The rear end of the frame is pivoted to rear wheel, a pivot penetrating through a return coil is inserted through a pipe holder provided at the rear end of the braking plate before the braking plate is pivoted to where close to the rear end of the frame, keeping a certain spacing from the rear wheel as long as the braking is not applied. Said braking plate related to a flat portion having its front end curved to form an arc portion and its rear end provided with a pipe holder to accommodate the pivot. A pair of wings respectively extends from both sides of the upper end of the arc portion with each wing attached with a piece of felt at its inner side. One hole is provided in the flat portion of the braking plate for the braking plate to be fixed to the linkage with a bolt and a nut Said linkage related to an arc portion having it upper end curved to form a plane provided with a hole, and another hole is provided at the lower end of the arc portion to restrict the braking wire to pull the linkage. The bolt penetrates through the hole in the flat portion of the braking plate and the hole in the linkage to be fixed by the nut and to connect the linkage and the braking plate in position. When the linkage is pulled by the braking wire in hand braking fashion, or the flat portion or the arc portion is forthwith stepped in foot braking fashion, the arc portion of the braking plate pressed down for the felt to hold against the rear wheel to execute the braking.

DETAILED DESCRIPTION OF THE PREFERRED EMBODIMENTS

Figure 1:
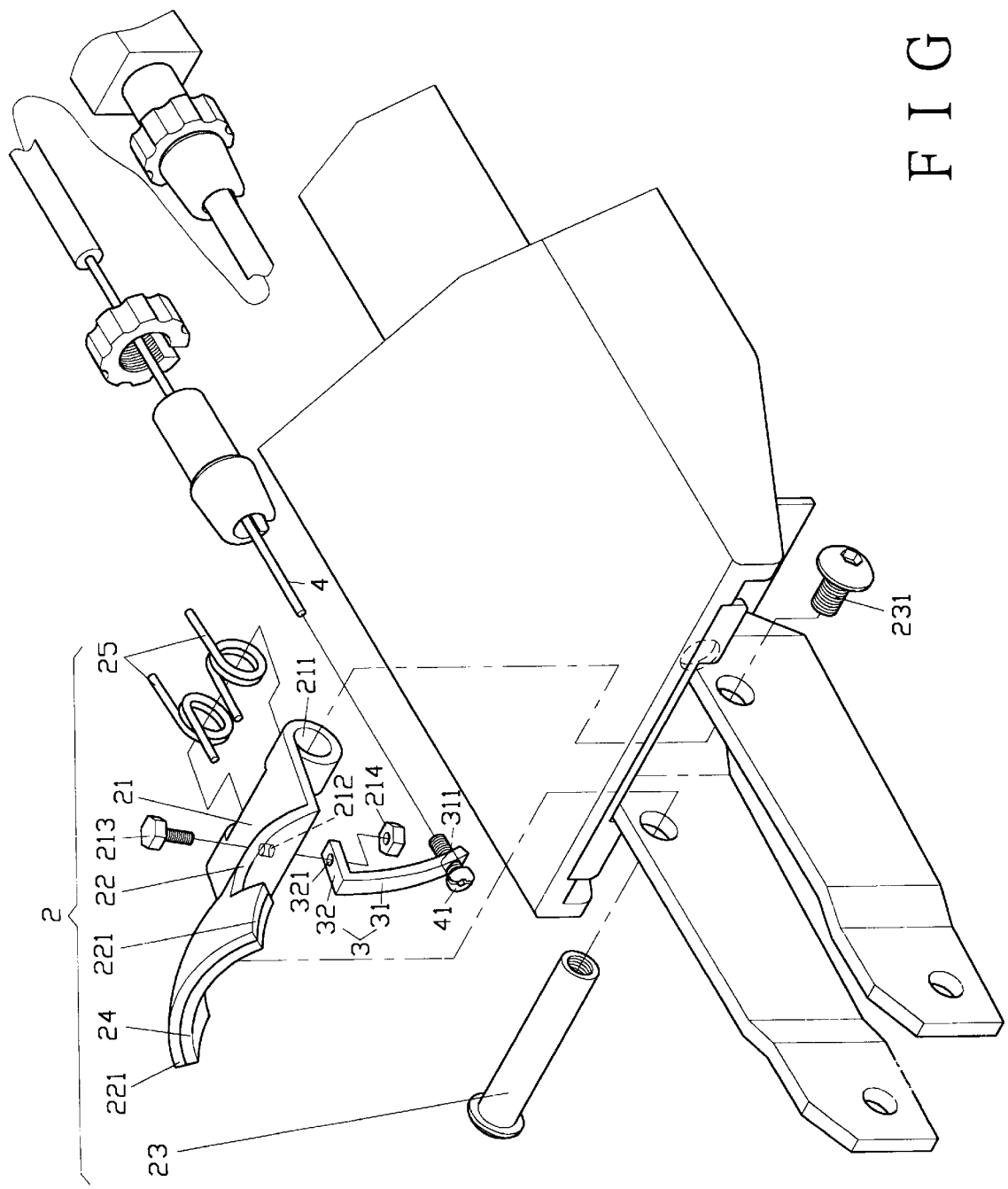
FIG. 1 is an exploded view of a preferred embodiment of the present invention.
Figure 2:
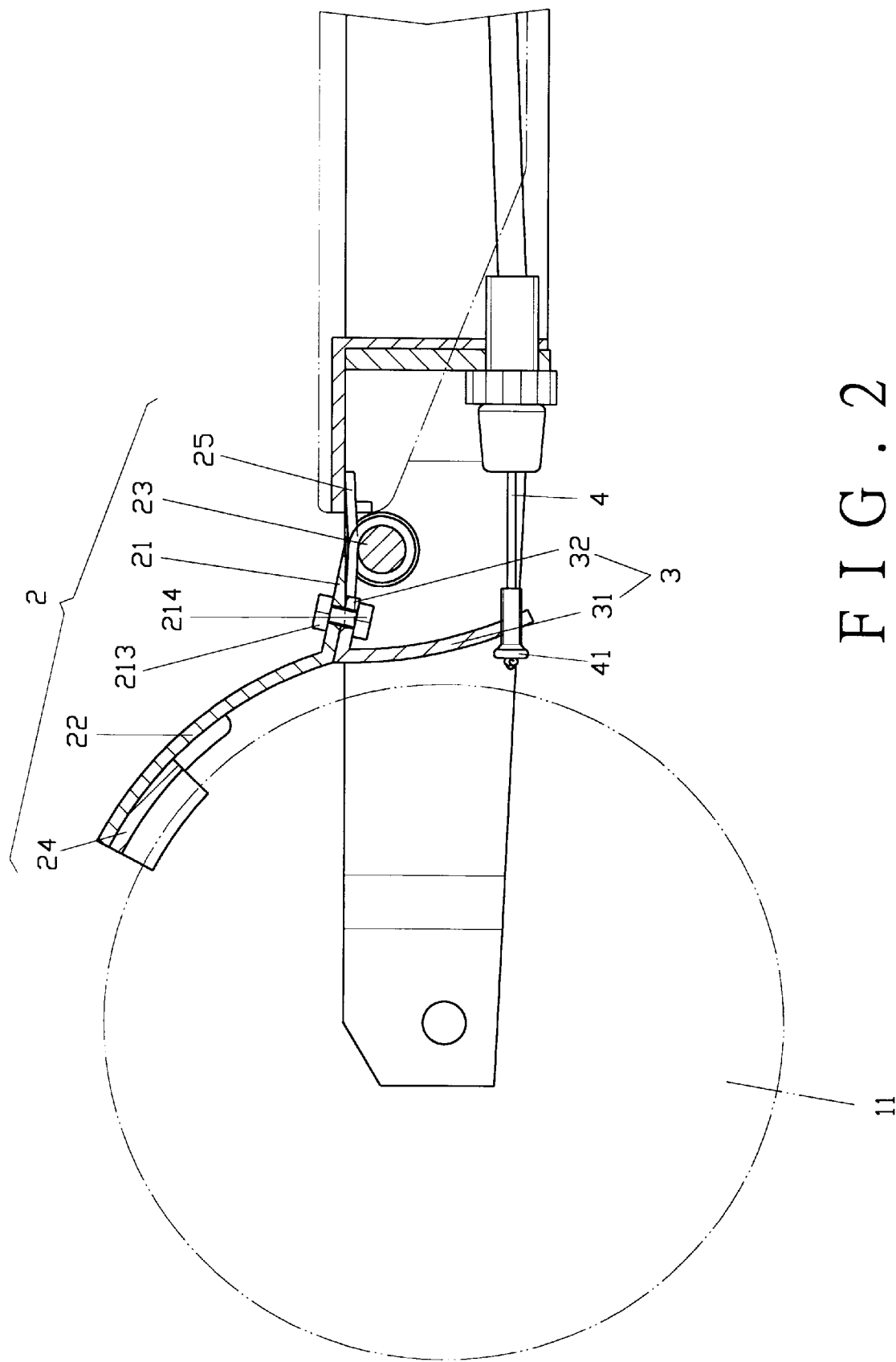
FIG. 2 is a side view of the preferred embodiment of the present invention.

Referring to FIGS. 1 and 2, a preferred embodiment of the present invention comprises a frame (1), a braking plate (2), a linkage (3) and a braking wire (4).

The rear end of the frame (1) is pivoted to a rear wheel (11). The braking plate (2) related to a flat portion (21) has its front end curved to form an arc portion (22) and its rear end formed with a pipe bolder (211) to accommodate a pivot (23) to be connected to the frame (1). A return coil (25) is inserted through the pivot (23) before the pivot (23) is pivoted to the frame (1) and fixed to the frame (1) with a locking bolt (231). A pair of wings (221) respectively extending from both sides at the upper end of said arc portion (22) each is attached a felt (24) at its inner side, which keeps a certain spacing from the rear wheel (11) under normal condition. A hole (212) is provided in the flat portion (21) and said flat portion (21) is fixed with a bolt (213) and a nut (214) for motion with the linkage Said linkage (3) relates to an arc plate (31) having its upper end curved to form a plane (32) provided with a hole (321), and another hole (311) is provided at the lower end of the linkage (3) to fix a head (41) of the braking wire (4) to pull the linkage (3) for motion.

Figure 3:
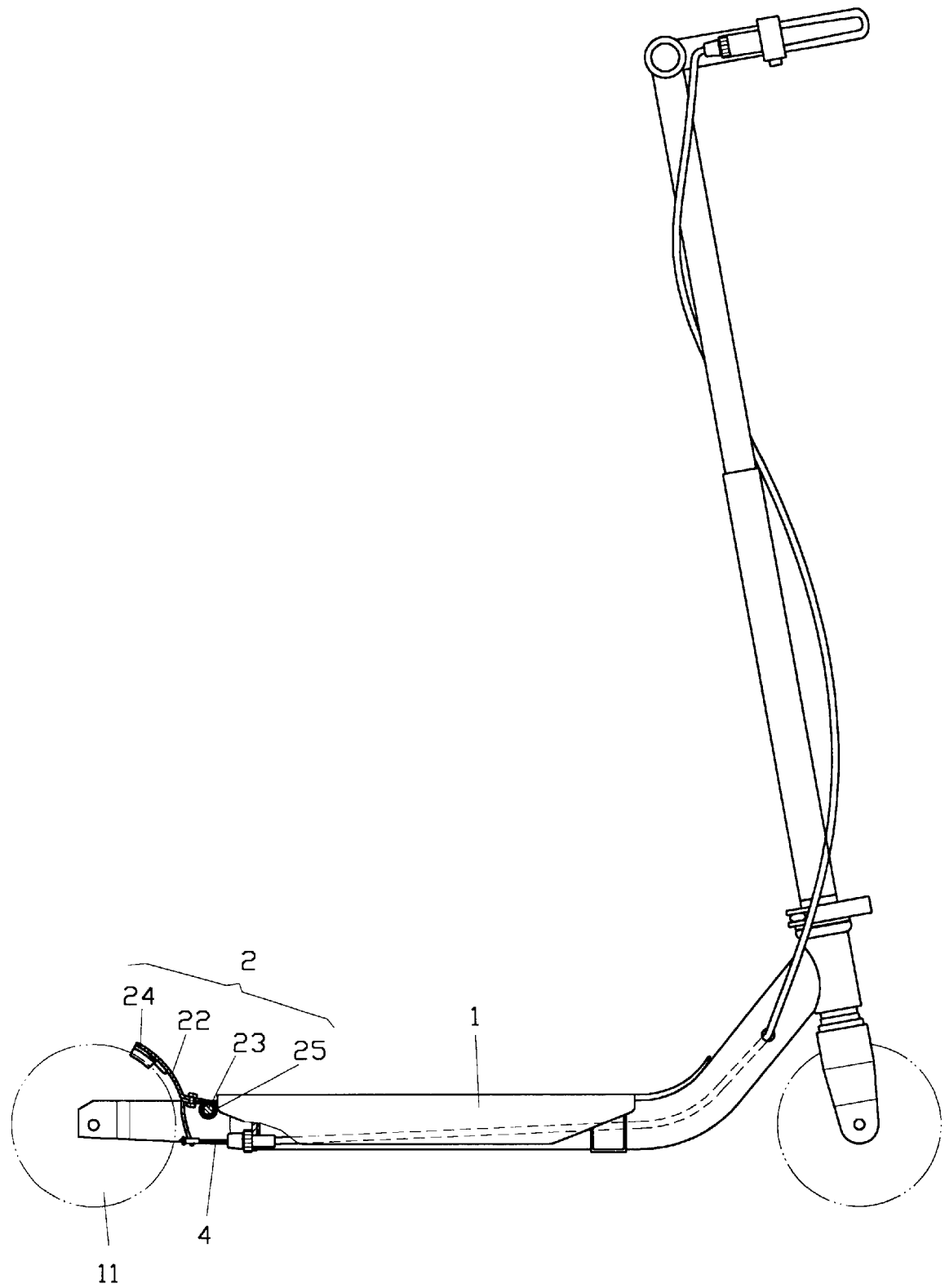
FIG. 3 is a side view of the preferred embodiment of the present invention applied to a scooter.

Upon assembly as illustrated in FIGS. 2 and 3, the bolt (213) passes through the hole (212) in the flat portion (21) of the braking plate (2) and the hole (321) in the plane (32) of the linkage (3) before being fixed with the nut (214), thus to connect the linkage (3) and the braking plate (2). Meanwhile, the braking plate (2) has its pivot (23) to penetrate the pipe holder (211) of the flat portion (21) and is pivoted to the frame (1) by having been fixed in position with the locking bolt (231).

Figure 4:
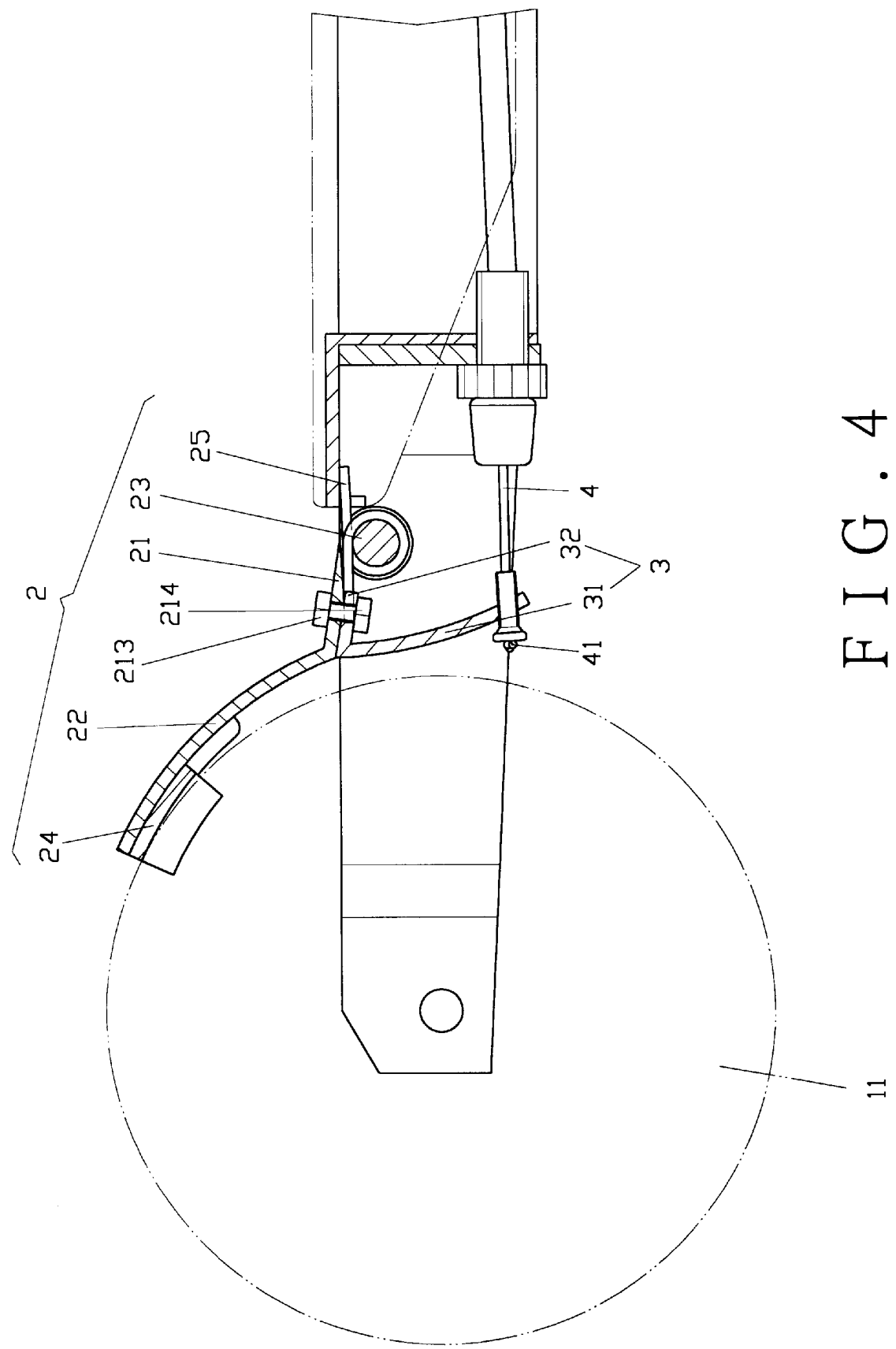
FIG. 4 is a schematic view showing operation of hand braking by the preferred embodiment of the present invention.

As illustrated in FIG. 4, once the hand braking is applied, the linkage (3) is pulled by the braking wire (4), the arc portion (21) of the braking plate (2) presses down for the felt (24) to hold against the rear wheel (11) to execute the braking.

Figure 5:
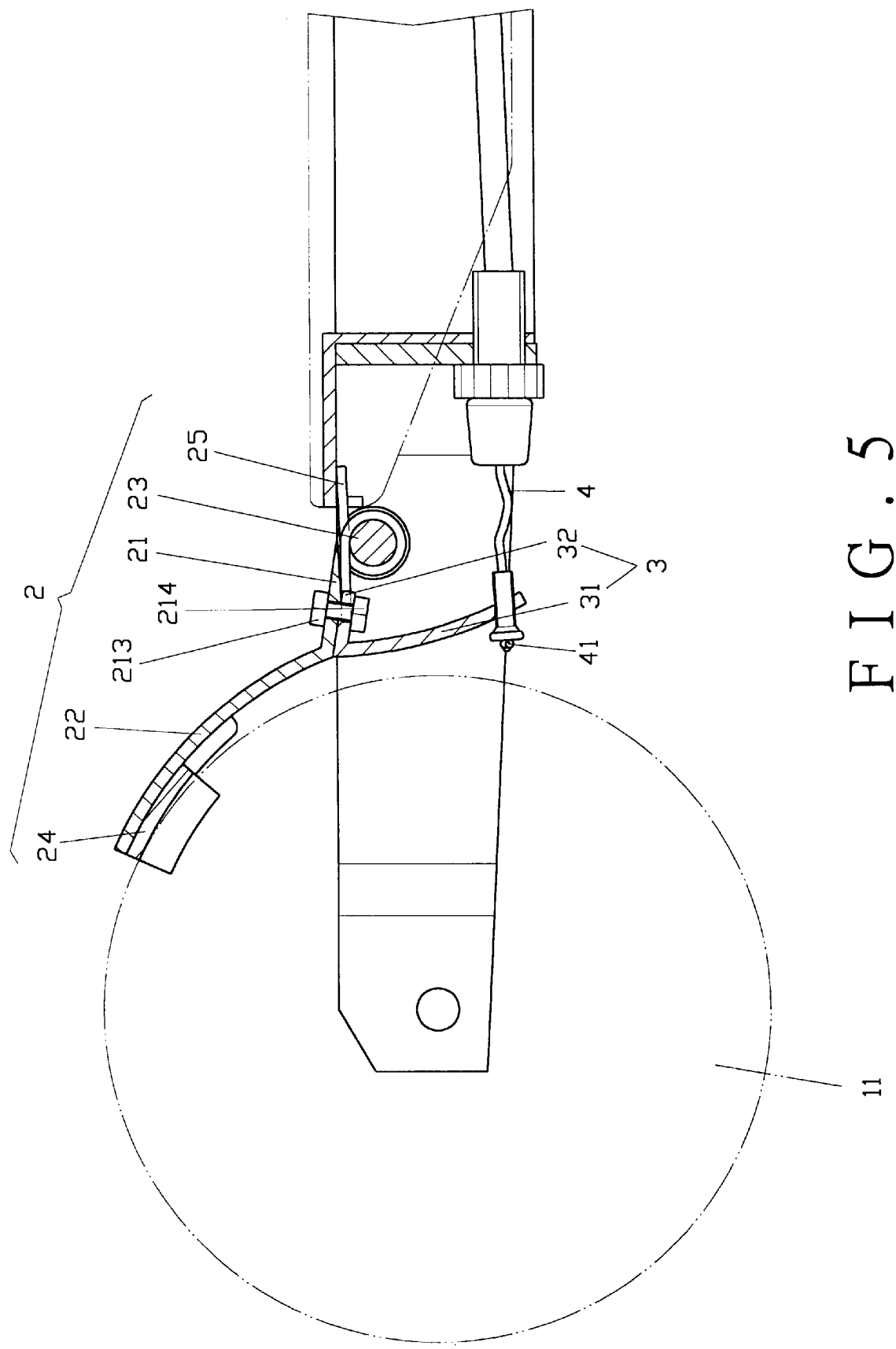
FIG. 5 is a schematic view showing operation of foot braking by the preferred embodiment of the present invention.

Upon applying the foot braking as illustrated in FIG. 5, either the flat portion (22) or the arc portion (21) of the braking plate (2) is directly stepped down for the arc portion (21) to press down and thus the felt (24) to hold against the rear wheel (11) to execute the braking.

I claim:

1. A scooter hand/foot braking mechanism comprising a frame, a braking plate, a linkage and a braking wire; wherein, the frame has its rear end pivotally to a rear wheel, a return coil penetrating through a pivot provided at the rear end of the braking plate for the braking plate to be pivoted close to the rear end of the frame and keeping a certain spacing from the rear wheel when the braking mechanism is not applied; and the braking wire is linked to the braking plate to press it against the rear wheel, characterized by that:

the braking plate has a flat portion with its front end curved to form an arc portion and a pipe holder located at the rear end of the flat portion for connection to the pivot, a pair of wings respectively extending from both sides at the upper end of the arc portion, and each wing being attached with a felt element at an inner thereof;

the linkage having an arc portion, said are portion of said linkage having its upper end curved to form a plane and provided with a hole, and its lower end provided with another hole to restrict the braking wire to pull the linkage;

the flat portion of the braking plate being fixed to the plane of the linkage, the arc portion of the braking plate being pressed down to have the felt element to hold against the rear wheel for executing the braking when the linkage is pulled by the braking wire during hand braking, or either the flat portion or the arc portion of the braking plate being forthwith stepped on.

2. A scooter hand/foot braking mechanism as claimed in claim 1, wherein, a hole is provided in the flat portion of the braking plate adapted with a bolt and a nut, and the bolt penetrates the hole in the flat portion of the braking plate and the hole in the linkage before being locked with the nut to connect the linkage and the braking plate in position.

* * * * *